(12) United States Patent
Xie et al.

(10) Patent No.: US 11,848,412 B2
(45) Date of Patent: Dec. 19, 2023

(54) SECONDARY BATTERY WITH PACKING BAG

(71) Applicant: Contemporary Amperex Technology Co., Limited, Ningde (CN)

(72) Inventors: Mianyu Xie, Ningde (CN); Min Zhang, Ningde (CN); Lei Chen, Ningde (CN); Xiao Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 602 days.

(21) Appl. No.: 17/043,149

(22) PCT Filed: Apr. 11, 2020

(86) PCT No.: PCT/CN2020/084340
§ 371 (c)(1),
(2) Date: Sep. 29, 2020

(87) PCT Pub. No.: WO2020/233275
PCT Pub. Date: Nov. 26, 2020

(65) Prior Publication Data
US 2023/0131176 A1    Apr. 27, 2023

(30) Foreign Application Priority Data
May 17, 2019    (CN) .......................... 201910413593.7

(51) Int. Cl.
*H01M 50/178* (2021.01)
*H01M 50/184* (2021.01)
(Continued)

(52) U.S. Cl.
CPC ..... *H01M 10/0525* (2013.01); *H01M 50/178* (2021.01); *H01M 50/184* (2021.01);
(Continued)

(58) Field of Classification Search
CPC ............. H01M 50/178; H01M 50/105; H01M 50/124; H01M 50/55; H01M 50/553;
(Continued)

(56) References Cited

U.S. PATENT DOCUMENTS

2007/0207379 A1* 9/2007 Hatta .................... H01M 10/48
383/109
2011/0086259 A1    4/2011 Kim et al.
(Continued)

FOREIGN PATENT DOCUMENTS

CN    204464336 U    7/2015
CN    205609588 U    9/2016
(Continued)

OTHER PUBLICATIONS

Non-Final Rejection mailed in copending U.S. Appl. No. 17/139,687 (dated 2023).*
(Continued)

*Primary Examiner* — Imran Akram
(74) *Attorney, Agent, or Firm* — ANOVA LAW GROUP, PLLC

(57) ABSTRACT

Provided is a secondary battery, including: an electrode assembly, a packing bag, an electrode lead and an insulation part; the electrode assembly is housed in the packing bag having a sealing part on edge, and the electrode lead is connected to the electrode assembly and passes through the sealing part. The sealing part includes a main body area, a first step area and a first transition area which are located on same side of the electrode lead along width direction, and the main body area, first transition area and first step area are successively arranged along direction approaching the electrode lead; the insulation part is wrapped around the electrode lead, and has a first portion which is located on a side of the electrode lead close to the main body area along width
(Continued)

direction and covered by the first step area on both sides in thickness direction.

20 Claims, 5 Drawing Sheets

(51) Int. Cl.
*H01M 50/105* (2021.01)
*H01M 50/124* (2021.01)
*H01M 50/133* (2021.01)
*H01M 50/55* (2021.01)
*H01M 10/0525* (2010.01)
*H01M 50/553* (2021.01)
*H01M 50/131* (2021.01)
*H01M 50/103* (2021.01)
*H01M 50/557* (2021.01)

(52) U.S. Cl.
CPC ........ *H01M 50/103* (2021.01); *H01M 50/105* (2021.01); *H01M 50/124* (2021.01); *H01M 50/131* (2021.01); *H01M 50/133* (2021.01); *H01M 50/55* (2021.01); *H01M 50/553* (2021.01); *H01M 50/557* (2021.01)

(58) Field of Classification Search
CPC ............. H01M 50/557; H01M 50/103; H01M 50/133; H01M 50/131; H01M 50/126; H01M 50/176; H01M 50/184; H01M 50/186
See application file for complete search history.

(56) References Cited

U.S. PATENT DOCUMENTS

| | | | | |
|---|---|---|---|---|
| 2012/0189906 A1* | 7/2012 | Nakajima | ............... | C08L 81/02 429/175 |
| 2013/0004835 A1* | 1/2013 | Roy | .................... | H01M 50/105 429/185 |
| 2013/0065113 A1* | 3/2013 | Oh | ...................... | H01M 10/052 429/179 |
| 2016/0099447 A1* | 4/2016 | Takada | ................ | H01M 50/105 429/211 |
| 2019/0067671 A1* | 2/2019 | Buckholz | ............ | H01M 50/178 |
| 2019/0252130 A1* | 8/2019 | Hasegawa | ............ | H01M 4/661 |

FOREIGN PATENT DOCUMENTS

| | | | |
|---|---|---|---|
| CN | 106252578 | A | 12/2016 |
| CN | 109580752 | A | 4/2019 |
| CN | 110190206 | A | 8/2019 |
| JP | 2005-353503 | A | 12/2005 |
| JP | 2006164784 | A | 6/2006 |
| JP | 2008251410 | A | 10/2008 |
| JP | 2012-199248 | A | 10/2012 |
| JP | 2016129113 | A | 7/2016 |
| JP | 2016162744 | A | 9/2016 |
| JP | 2016225118 | A | 12/2016 |
| KR | 10-2017-0004686 | A | 1/2017 |

OTHER PUBLICATIONS

International Search Report dated May 29, 2020 in corresponding International application No. PCT/CN2020/084340; 4 pages.
Examination Report dated May 7, 2020 of corresponding Chinese application No. 201910413593.7; 4 pages.
Search Report dated Jun. 8, 2021 in corresponding European Application No. 20775156.1; 9 pages.
The World Intellectual Property Organization (WIPO) International Search Report and written opinion for PCT/CN2020/084340 dated May 29, 2020 15 pages (including English translation).
The China National Intellectual Property Administration (CNIPA) The First Office Action for Chinese Application 202010894166.8 22 Pages (With Translation).
The China National Intellectual Property Administration (CNIPA) The Second Office Action for Chinese Application 202010894166.8 dated Feb. 11, 2023 6 Pages (With Translation).
The China National Intellectual Property Administration (CNIPA) The Third Office Action for Chinese Application 202010894166.8 dated Apr. 19, 2023 6 Pages (With Translation).
The China National Intellectual Property Administration (CNIPA) The Notification to Grant Patent Right for Invention for Chinese Application 201910413593.7 3 Pages (With Translation).
The China National Intellectual Property Administration (CNIPA) The First Office Action for Invention for Chinese Application 201910413593.7 9 Pages (With Translation).
The European Patent Office (EPO) The Intention to grant for EP Application No. 20775156.1 dated Jun. 27, 2022 5 Pages.
The European Patent Office (EPO) The Communication pursuant to Article 94(3)EPC for EP Application No. 20775156.1 dated Jan. 11, 2022 5 Pages.

* cited by examiner

SECONDARY BATTERY WITH PACKING BAG

CROSS-REFERENCE TO RELATED APPLICATIONS

The present application is a national stage of International Application No. PCT/CN2020/084340, filed on Apr. 11, 2020, which claims priority to Chinese Patent Application No. 201910413593.7, filed on May 17, 2019 to China National Intellectual Property Administration and entitled "SECONDARY BATTERY". The disclosures of the aforementioned applications are incorporated herein by reference in their entireties.

TECHNICAL FIELD

The present application relates to the field of batteries and, in particular to a secondary battery.

BACKGROUND

As the rapid development of portable electronic devices, requirements for energy density of batteries are also increasingly high. In a secondary battery, a packing bag made of an aluminum-plastic film or a steel-plastic film may be used as a replacement of a metal shell to lower the weight of the battery and increase the energy density.

SUMMARY

The objective of the present application is to provide a secondary battery which could improve the sealing performance of the secondary battery.

In order to achieve the above objective, the present application provides a secondary battery, which includes an electrode assembly, a packing bag, an electrode lead and an insulation part. The electrode assembly is housed in the packing bag, the packing bag has a sealing part on an edge, and the electrode lead is connected to the electrode assembly and passes through the sealing part. The sealing part includes a main body area, a first step area and a first transition area; the main body area, the first transition area and the first step area are located on a same side of the electrode lead along a width direction, and the main body area, the first transition area and the first step area are successively arranged along a direction approaching the electrode lead. The insulation part is wrapped around outside of the electrode lead and separates the sealing part from the electrode lead. The insulation part has a first portion, and the first step area covers the first portion on both sides in a thickness direction. Along the thickness direction, a thickness of the main body area is $H_1$, a sum of thicknesses of the first portion and the first step area is $H_2$; along the width direction, a width of the first step area is $L_1$.

$H_1$, $H_2$ and $L_1$ satisfy the following relational expressions:

$$H_1 < H_2; \quad 0.02 \leq \frac{L_1 - 0.3}{10H_2 - 2} \leq 2.2.$$

As a further improvement of the secondary battery of the present application, $H_2$ and $L_1$ satisfy the following relational expression:

$$0.08 \leq \frac{L_1 - 0.3}{10H_2 - 2} \leq 1.2.$$

As a further improvement of the secondary battery of the present application, $H_2$ and $L_1$ satisfy the following relational expression:

$$0.2 \leq \frac{L_1 - 0.3}{10H_2 - 2} \leq 0.9.$$

As a further improvement of the secondary battery of the present application, $H_1$ and $H_2$ satisfy the following relational expression: $0.1 \text{ mm} < H_2 - H_1 < 0.6 \text{ mm}$.

As a further improvement of the secondary battery of the present application, the main body area and the first step area are connected by the first transition area; the first transition area has two outer surfaces disposed oppositely along the thickness direction, and the two outer surfaces are tilted with respect to the main body area towards a direction approaching the first step area.

As a further improvement of the secondary battery of the present application, the two outer surfaces of the first transition area are disposed asymmetrically with respect to a plane that is perpendicular to the thickness direction.

As a further improvement of the secondary battery of the present application, along the width direction, a width of the first transition area is $L_2$, and $L_1$ and $L_2$ satisfy the following relational expression: $L_2 \leq 0.4L_1$.

As a further improvement of the secondary battery of the present application, the sealing part further includes a second step area, and the second step area is connected to the first step area and located on both sides of the electrode lead along the thickness direction. The insulation part further has a second portion, and the second portion is disposed between the second step area and the electrode lead. Along the thickness direction, a sum of thicknesses of the second step area, the second portion and the electrode lead is $H_3$, and $H_3$ is larger than $H_2$.

As a further improvement of the secondary battery of the present application, the sealing part further includes a second transition area, and the second transition area is connected between the first step area and the second step area. The insulation part further has a third portion, and the first portion and the second portion are connected by the third portion; the second transition area covers the third portion on both sides in the thickness direction. Along a direction in which the main body area points towards the second step area, a sum of thicknesses of the second transition area and the third portion gradually increases.

As a further improvement of the secondary battery of the present application, along the direction in which the main body area points towards the second step area, a thickness of the third portion gradually increases.

As a further improvement of the secondary battery of the present application, the packing bag includes two layers of packing films; the electrode assembly is located between the two layers of the packing films, and the two layers of the packing films are connected at an edge and form the sealing part. Each of the packing films includes a protective layer, a metal layer and a connection layer; the connection layer is disposed on a surface of the metal layer facing the electrode assembly, and the protective layer is disposed on a surface of the metal layer away from the electrode assembly. In the main body area, connection layers of the two layers of the packing films are fused into a whole; in the first step area, the connection layer of each of the packing films is fused with the first portion.

The beneficial effects of the present application are as follows: the larger the value of $L_1$, the larger the melting volumes of the first portion and the connection layers located in the first step area, so that more colloids would be produced and the amount of the colloids filled into a gap of the first transition area would be more. Inversely, the smaller the value of $L_1$, the smaller the amount of the colloids filled into the gap of the first transition area. $H_2$ is the final thickness of the first portion and the connection layers located in the first step area after hot press molding. The smaller the value of $H_2$, the more the amount of the colloids filled into the gap of the first transition area; inversely, the larger the value of $H_2$, the less the amount of the colloids filled into the gap of the first transition area.

$H_2$ and $L_1$ of the present application satisfy the following relational expression:

$$0.02 \le \frac{L_1 - 0.3}{10H_2 - 2} \le 2.2,$$

so that the amount of the colloids filled into the gap of the first transition area could be maintained within a suitable range, and the sealing performance of the packing bag could be guaranteed.

DESCRIPTION OF EMBODIMENTS

In order to make the objectives, technical solutions and advantages of the present application clearer, the present application will be further described in detail below in combination with the accompanying drawings and embodiments. It should be understood that the specific embodiments described herein are only used to interpret the present application rather than limiting the present application.

In the descriptions of the present application, unless specified and limited otherwise, the terms "first", "second" and "third" are only used for the purpose of description and cannot be understood as indicating or implying the relative importance; the term "a plurality of" refers to two and more (including two); unless specified or explained otherwise, the term "connection" shall be understood in a broad sense, for example, the "connection" may be a fixed connection, or may be a detachable connection, or an integrated connection, or an electrical connection, or a signal connection; the "connection" may be a direct connection or an indirect connection through an intermediate medium. For those of ordinary skill in the art, the specific meanings of the above terms in the present application can be understood according to specific situations.

In the descriptions of the specification, it need to be understood that the "up", "down" and other locative words described in embodiments of the present application are described from the angle shown in the accompanying drawings, which shall not be understood as limitations to the embodiments of the present application. The present application will be further described in detail with specific embodiments in combination with the accompanying drawings.

In an embodiment, an electrode assembly of a secondary battery is housed in a packing bag, and the edge of the packing bag may be in a sealed connection by hot pressing and forms a sealing part. Of course, in order to realize the charge and discharge of the electrode assembly, the secondary battery further includes an electrode lead and an insulation part. The electrode lead is connected to the electrode assembly and extends to the outside of the packing bag. The insulation part is wrapped around outside of the electrode lead and separates the electrode lead and the sealing part. However, there is a height difference on the sealing part in an area close to the edge of the insulation part and a step is formed; when performing the hot pressing, wrinkles may be easily formed in the proximity of the step of the sealing part, which may affect the sealing performance of the packing bag.

Figure 1:
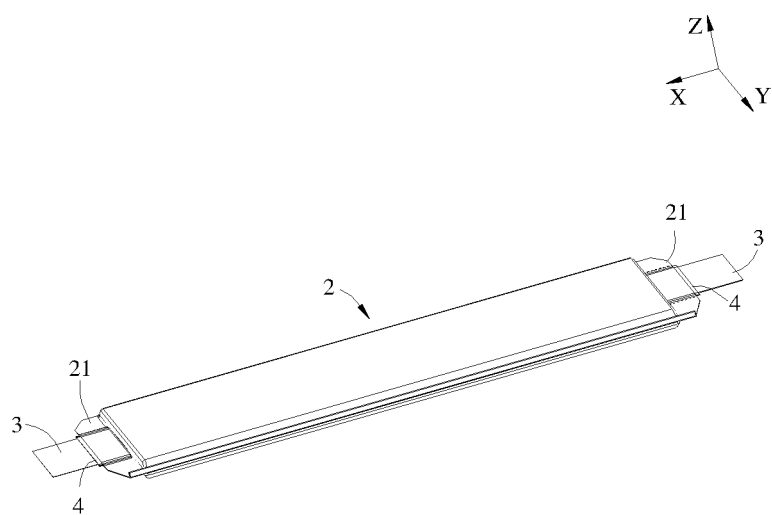
FIG. 1 is a schematic diagram of a secondary battery provided by an embodiment of the present application.
Figure 2:
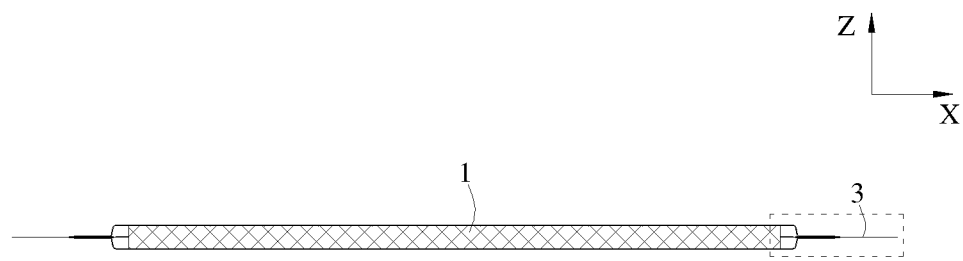
FIG. 2 is a sectional view of a secondary battery provided by an embodiment of the present application.
Figure 3:
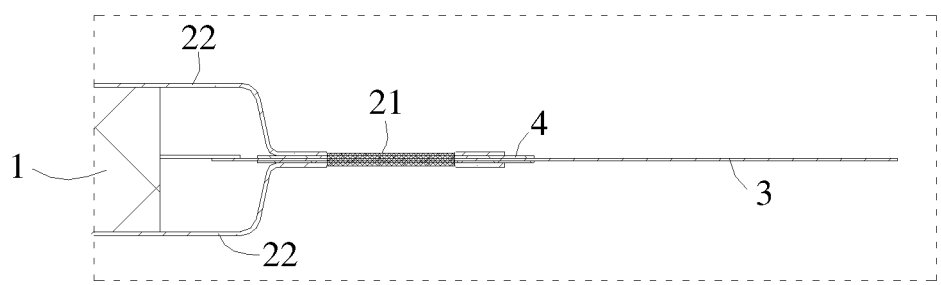
FIG. 3 is an enlarged view of a box portion of FIG. 2.

Referring to FIG. 1 to FIG. 3, a secondary battery provided by an embodiment includes an electrode assembly 1, a packing bag 2, an electrode lead 3 and an insulation part 4.

The electrode assembly 1 is a core component of the secondary battery for achieving charge and discharge functions. The electrode assembly 1 includes an anodic pole piece, a cathodic pole piece and a separator, and the separator separates the anodic pole piece and the cathodic pole piece. The anodic pole piece includes an anodic current collector and an anodic active material layer coated on a surface of the anodic current collector. The anodic current collector may be an aluminum foil, and the anodic active material layer includes a ternary material, lithium manganate or lithium iron phosphate. The cathodic pole piece includes a cathodic current collector and a cathodic active material layer coated on a surface of the cathodic current collector. The cathodic current collector may be a copper foil, and the cathodic active material layer includes graphite or silicon.

The electrode assembly 1 may be of a coiled structure. Specifically, there is one anodic pole piece and one cathodic pole piece, and both of the anodic pole piece and the cathodic pole piece are of a band-shaped structure. The anodic pole piece, the cathodic pole piece and the separator are successively stacked and then coiled for two and more rounds to form the electrode assembly 1. In the preparation of the electrode assembly 1, the electrode assembly 1 may be first coiled into a hollow column structure and then flattened into a flat shape after the coiling.

Alternatively, the electrode assembly 1 may also be of a stacked structure. Specifically, a plurality of anodic pole pieces are disposed, and a plurality of cathodic pole pieces are disposed. The plurality of the anodic pole pieces and the plurality of the cathodic pole pieces are alternately stacked along the thickness direction Z, and the anodic pole piece and the cathodic pole piece are separated by the separator.

Figure 6:
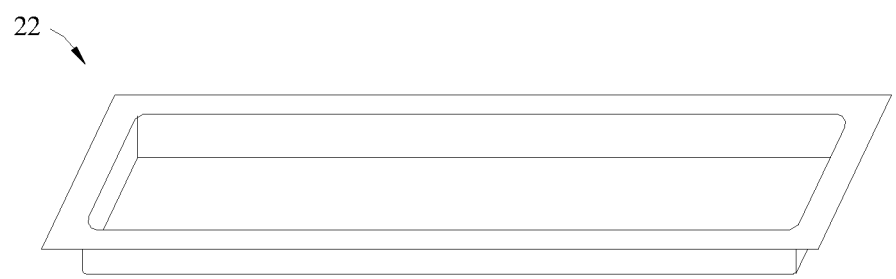
FIG. 6 is a schematic diagram of a packing film of a packing bag of a secondary battery provided by an embodiment of the present application.

The packing bag 2 includes two layers of packing films 22, and the two layers of the packing films 22 are disposed up and down along the thickness direction Z. Referring to FIG. 6, a cavity is formed in at least one layer of the packing films 22 via stamping, and the electrode assembly 1 is located between two layers of the packing films 22 and housed in the cavity.

Figure 7:
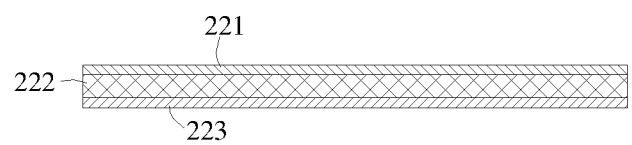
FIG. 7 is a cross-sectional view of the packing film of FIG. 6.

Referring to FIG. 7, each of the packing films 22 includes a protective layer 221, a metal layer 222 and a connection layer 223. The protective layer 221 and the connection layer 223 are disposed on two sides of the metal layer 222, respectively. Specifically, the protective layer 221 may be attached onto a surface of the metal layer 222 away from the electrode assembly 1 via an adhesive, and the connection layer 223 may be attached onto a surface of the metal layer 222 close to the electrode assembly 1 via an adhesive.

The material of the protective layer 221 may be nylon or polyethylene terephthalate; the material of the metal layer 222 may be an aluminum foil or a steel foil; and the material of the connection layer 223 may be polypropylene.

The two layers of the packing film 22 are connected on the edge and form a sealing part 21. Specifically, the connection layers 223 of the two layers of the packing films 22 are directly or indirectly connected together by hot pressing, so that the sealed packing bag 2 is formed.

The electrode lead 3 is connected to the electrode assembly 1, and passes through the sealing part 21 and extends to the outside of the packing bag 2. Specifically, there may be two electrode leads 3. One of the electrode leads 3 is connected to the anodic current collector of the anodic pole piece, and the other of the electrode leads 3 is connected to the cathodic current collector of the cathodic pole piece. The two electrode leads 3 connect the electrode assembly 1 with other components outside the packing bag 2, thereby achieving the charge and discharge of the electrode assembly 1. The material of the electrode lead 3 may be aluminum, nickel or copper-plated nickel.

The two electrode leads 3 may extend to the outside from two ends of the packing bag 2 along the length direction X, respectively, or may extend to the outside from the same end of the packing bag 2 along the length direction X.

There may be two insulation parts 4. The two insulation parts 4 respectively separate the two electrode leads 3 and the sealing part 21. Each of the insulation parts 4 is wrapped around outside of a corresponding electrode lead 3. Part of the insulation part 4 is sandwiched between the two layers of the packing films 22 to separate the electrode lead 3 and the packing films 22 and to reduce the risk of contact between the electrode lead 3 and the metal layers 222. The material of the insulation part 4 may be polypropylene.

Because part of the insulation part 4 is sandwiched between the two layers of the packing films 22, the connection layers 223 of the two layers of the packing films 22 will be fused with the insulation part 4 when hot pressing is performed on the two layers of the packing films 22.

Figure 4:
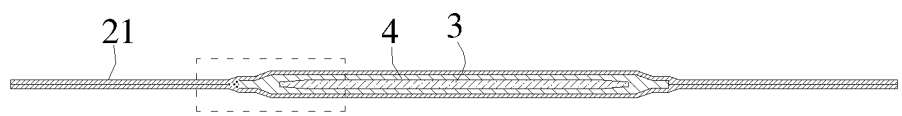
FIG. 4 is another sectional view of a secondary battery provided by an embodiment of the present application.
Figure 5:
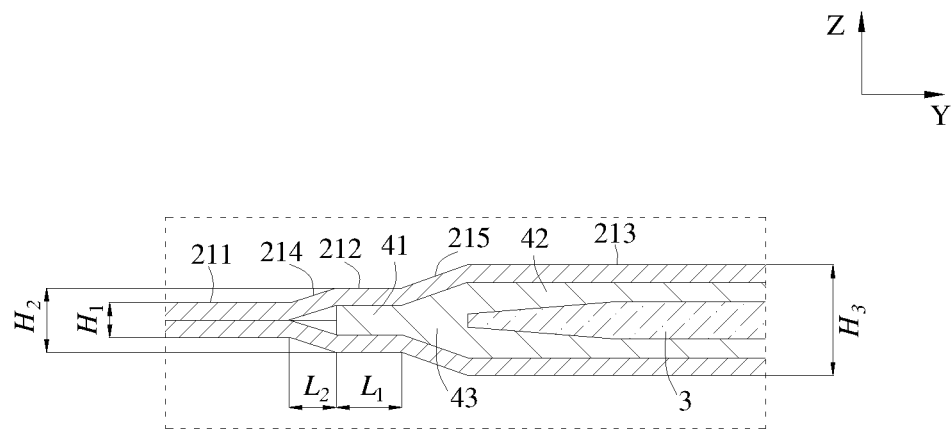
FIG. 5 is an enlarged view of a box portion of FIG. 4.

Specifically, referring to FIG. 4 and FIG. 5, the sealing part 21 includes a main body area 211, a first step area 212 and a first transition area 214; the main body area 211, the first transition area 214 and the first step area 212 are located on the same side of the electrode lead 3 along the width direction Y, and the main body area 211, the first transition area 214 and the first step area 212 are successively arranged along a direction approaching the electrode lead 3. The first transition area 214 is connected between the main body area 211 and the first step area 212.

In the main body area 211, the connection layers 223 of the two layers of the packing films 22 are directly fused into a whole. In the thickness direction Z, the thickness of the main body area 211 is $H_1$. The value of $H_1$ is generally a constant. Of course, the thickness $H_1$ of the main body area 211 may fluctuate within a certain range such as plus or minus 0.01 mm owing to the hot pressing process. The value of $H_1$ may be 0.2 mm~0.4 mm.

The insulation part 4 has a first portion 41, and the first portion 41 is located on a side of the electrode lead 3 close to the main body area 211 along the width direction Y; the first step area 212 covers the first portion 41 on both sides in the thickness direction Z. The first step area 212 is divided into two layers, i.e. an upper layer and a lower layer, and the first portion 41 is located between the two layers of the first step area 212.

In the first step area 212, the connection layer 223 of each packing film 22 is fused with the first portion 41. Along the thickness direction Z, the sum of the thicknesses of the first portion 41 and the first step area 212 is $H_2$. The value of $H_2$ is generally a constant. Of course, $H_2$ may fluctuate within a certain range such as plus or minus 0.01 mm owing to the hot pressing process. The value of $H_2$ may be 0.3 mm~0.9 mm. Along the width direction Y, the width of the first step area 212 is $L_1$.

In the main body area 211, the two layers of the packing films 22 are directly fused together, while in the first step area 212, the two layers of the packing films 22 are fused with the first portion 41 of the insulation part 4. Therefore, the value of $H_1$ will be smaller than the value of $H_2$, and there will be a height difference between the main body area 211 and the first step area 212. The first transition area 214 connected between the main body area 211 and the first step area 212 may play a role of transition.

Figure 8:
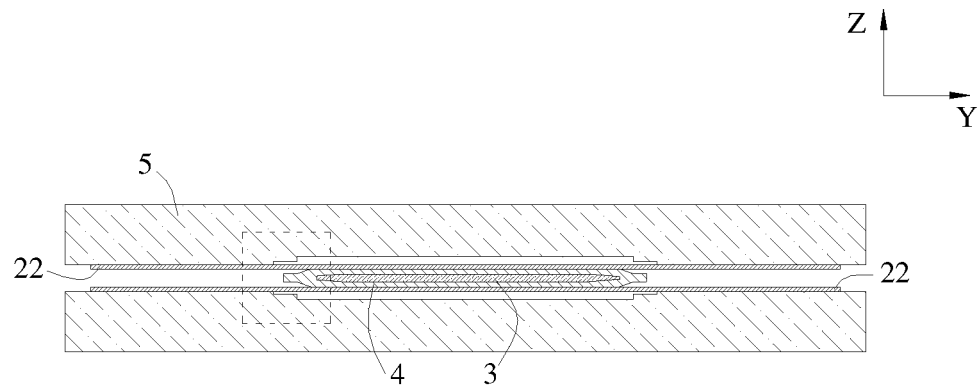
FIG. 8 is a schematic diagram of a secondary battery before being molded provided by an embodiment of the present application.

In order to realize the fusion of the main body area 211 and the fusion of the first step area 212, a packaging device 5 with a step-shaped packaging surface is usually used. Specifically, referring to FIG. 8 and FIG. 9, the packaging device 5 includes a first packaging surface 51 and a second packaging surface 52, and the second packaging surface 52 is sunk with respect to the first packaging surface 51. When the hot pressing is performed, the first packaging surface 51 acts on the main body area 211, and the second packaging surface 52 acts on the first step area 212.

Figure 9:
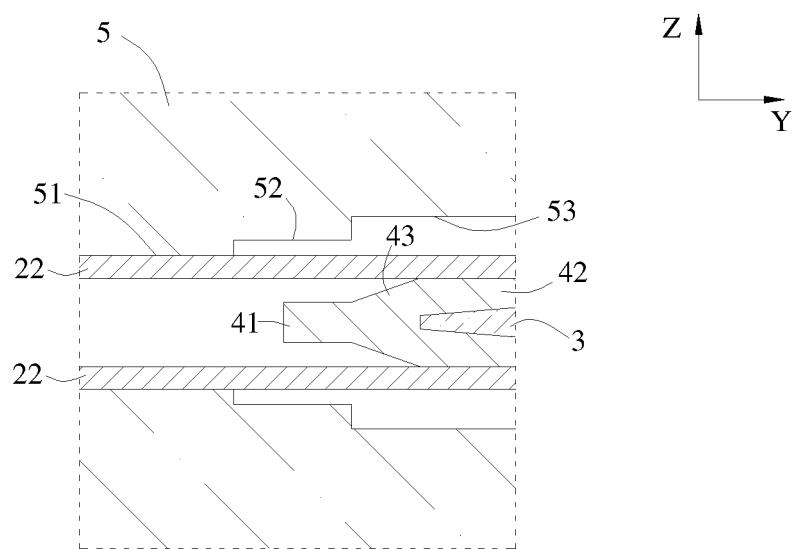
FIG. 9 is an enlarged view of a box portion of FIG. 8.
Figure 10:
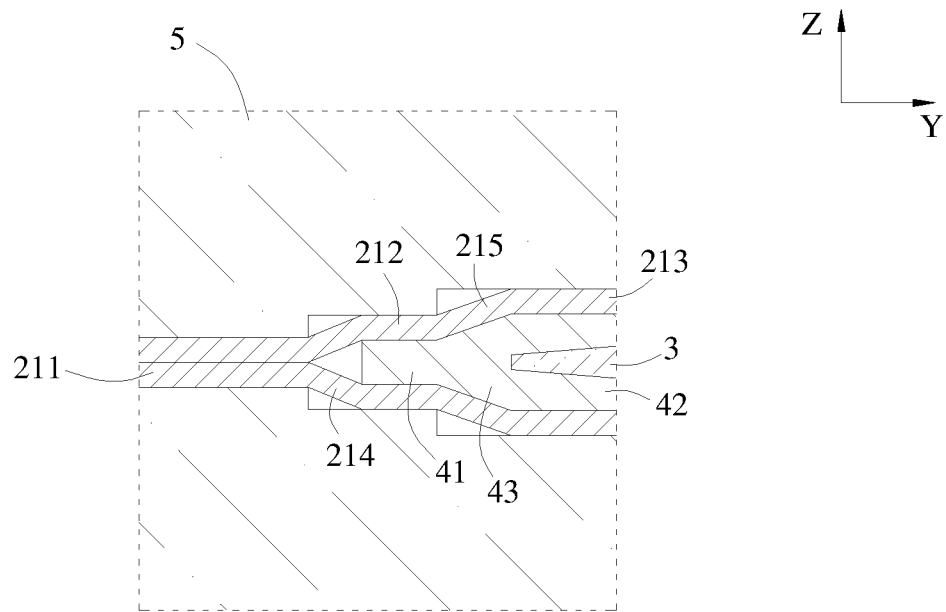
FIG. 10 is a schematic diagram of a secondary battery during molding provided by an embodiment of the present application.

Referring to FIG. 9 and FIG. 10, when the hot pressing is performed, a certain distance may exist between the main body area 211 and the first portion 41 due to a fabrication error, which leads to that the first transition area 214 cannot be attached to the first portion 41. In this case, there will be a gap between the two layers of the packing films 22 in the first transition area 214. In addition, when the hot pressing is performed, the first transition area 214 is in a tilted state, and thus will not be subjected to the pressure of the second packaging surface 52. Therefore, in the first transition area 214, the connection layers 223 of the two layers of the packing films 22 cannot be directly fused together.

Figure 11:
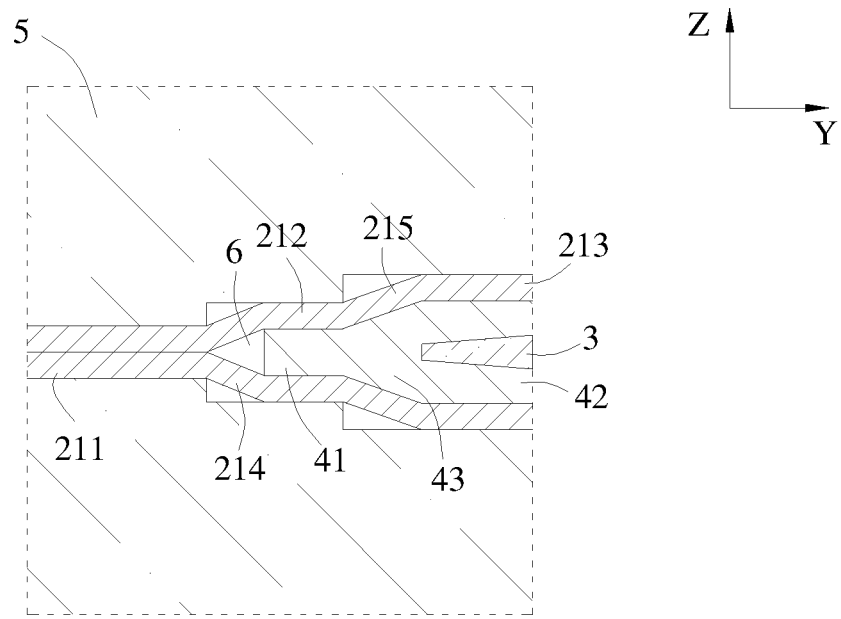
FIG. 11 is another schematic diagram of a secondary battery during molding provided by an embodiment of the present application.

Referring to FIG. 11, during the process of hot pressing, the first portion 41 and the connection layers 223 located in the first step area 212 are heated and melted to produce colloids 6 with viscidity, and part of the colloids 6 flow into the gap of the first transition area 214 under the pressure. The colloids 6 fill the gap and stick the connection layers 223 in the first transition area 214 together, thereby achieving sealing.

However, if the amount of the colloids 6 filled into the gap of the first transition area 214 is insufficient, the connection strength of the connection layers 223 located in the first transition area 214 is low, which is easy to cause a sealing failure, and there may be a risk of electrolyte leakage. While if the amount of the colloids 6 flowing into the gap of the first transition area 214 exceeds the accommodation space of the gap, the colloids 6 will flow towards the main body area 211 under the pressure. Because the main body area 211 is subjected to the pressure of the first packaging surface 51, the colloids 6 flowing towards the main body area 211 may lead to uneven pressure on the main body area 211, resulting in that wrinkles appear on the metal layers 222 of the main body area 211, affecting the flatness of the main body area 211 and reducing the sealing performance.

Hence, in order to guarantee the sealing performance, the amount of the colloids 6 filled into the gap of the first transition area 214 needs to be controlled.

The colloids 6 flowing into the gap of the first transition area 214 mainly come from the first portion 41 and the connection layers 223 located in the first step area 212. So the values of $L_1$ and $H_2$ have direct influences on the amount of the colloids 6.

The larger the value of $L_1$, the larger the melting volumes of the first portion 41 and the connection layers 223 located in the first step area 212, so that more colloids 6 would be produced and the amount of the colloids 6 filled into the gap of the first transition area 214 would be more. Inversely, the smaller the value of $L_1$, the less the amount of the colloids 6 filled into the gap of the first transition area 214.

$H_2$ is the final thickness of the first portion 41 and the connection layers 223 located in the first step area 212 after hot press molding. The smaller the value of $H_2$, the more the amount of the colloids 6 of the first portion 41 and the connection layers 223 located in the first step area 212 that are lost during the hot pressing, i.e. the more the amount of the colloids 6 filled into the gap of the first transition area 214; inversely, the larger the value of $H_2$, the less the amount of the colloids 6 filled into the gap of the first transition area 214.

The inventor discovered that when $H_2$ and $L_1$ satisfy the following relational expression:

$$0.02 \leq \frac{L_1 - 0.3}{10H_2 - 2} \leq 2.2,$$

the amount of the colloids 6 filled into the gap of the first transition area 214 could be maintained within a suitable range, and the sealing performance of the packing bags 2 could be guaranteed.

In an implementation, $H_2$ and $L_1$ satisfy the following relational expression:

$$0.08 \leq \frac{L_1 - 0.3}{10H_2 - 2} \leq 1.2.$$

Further in an implementation, $H_2$ and $L_1$ satisfy the following relational expression:

$$0.2 \leq \frac{L_1 - 0.3}{10H_2 - 2} \leq 0.9.$$

The width $L_1$ of the first step area 212 is 0.4 mm-2.5 mm. If the value of $L_1$ is smaller than 0.4 mm, an insufficient amount of the colloids 6 filled into the gap of the first transition area 214 may be caused, resulting in a poor sealing performance; and meanwhile, if the value of $L_1$ is too small, the first step area 212 is likely to miss the hot pressing by the second packaging surface 52 because of the fabrication error of the hot pressing. If the value of $L_1$ is larger than 2.5 mm, an excessive amount of the colloids 6 filled into the gap of the first transition area 214 may be caused, resulting in that the metal layers 222 of the main body area 211 wrinkle.

Referring to FIG. 5, the first transition area 214 has two outer surfaces disposed oppositely along the thickness direction Z, and the two outer surfaces are tilted with respect to the main body area 211 towards a direction approaching the first step area 212. An outer surface of the main body area 211 and an outer surface of the first step area 212 are connected by the outer surface of the first transition area 214. The outer surface of the first transition area 214 may extend from an end of the outer surface of the main body area 211 and be tilted with respect to the outer surface of the main body area 211 towards a direction approaching the outer surface of the first step area 212.

In the thickness direction Z, a distance between the two outer surfaces of the first transition area 214 is D. The value of D gradually increases along a direction in which the main body area 211 points towards the first step area 212 and which is parallel to the width direction Y. In other words, the sum of the thicknesses of the first transition area 214 and the colloids 6 filled into the gap of the first transition area 214 increases gradually along the direction in which the main body area 211 points towards the first step area 212.

If the amount of the colloids 6 filled into the gap of the first transition area 214 is excessive, the colloids 6 will squeeze the first transition area 214, which leads to a bulged deformation of the outer surfaces of the first transition area 214; in this case, the value of D fluctuates along the direction in which the main body area 211 points towards the first step area 212, rather than gradually increasing. In other words, by detecting whether D is gradually increasing, it can be determined whether the colloids 6 filled into the gap of the first transition area 214 are excessive.

In an implementation, the two outer surfaces of the first transition area 214 are disposed asymmetrically with respect to a plane that is perpendicular to the thickness direction Z. In an asymmetrical manner, the two outer surfaces of the first transition area 214 can have different slopes, so that the two outer surfaces of the first step area 212 protrude from the main body area 211 to different degrees.

Referring to FIG. 10 and FIG. 11, when the hot pressing is performed, the gap of the first transition area 214 is approximately a triangle, and the volume of the gap of the first transition area 214 depends on a size of the gap along the width direction Y and a size of the gap along the thickness direction Z.

After the hot press molding, a difference of $H_2$ and $H_1$ determines the size of the gap of the first transition area 214 along the thickness direction Z. In other words, the smaller the value of $H_2-H_1$, the smaller the volume of the gap of the first transition area 214, and the less the colloids that are needed; inversely, the larger the value of $H_2-H_1$ is, the larger the volume of the gap of the first transition area 214, and the more the colloids that are needed.

The inventor discovered that when $H_1$ and $H_2$ satisfy the following relational expression: 0.1 mm<$H_2-H_1$<0.6 mm, the amount of the colloids 6 filled into the gap of the first transition area 214 could be maintained within a suitable range. If $dH_2-H_1<0.1$ mm, the gap of the first transition area 214 is too small, which causes the colloids 6 to flow towards the main body area 211, resulting in that the metal layers 222 of the main body area 211 wrinkle. While if $H_2-H_1>0.6$ mm, the gap of the first transition area 214 is too large, and the amount of the colloids 6 filled into the gap of the first transition area 214 is insufficient, which leads to a poor sealing performance.

Along the width direction Y, the width $L_2$ of the first transition area 214 is 0.1 mm~0.5 mm. If $L_2<0.1$ mm, the gap of the first transition area 214 is too small, which causes the colloids 6 to flow towards the main body area 211, resulting in that the metal layers 222 of the main body area 211 wrinkle. If $L_2>0.5$ mm, the gap of the first transition area 214 is too large, and the amount of the colloids 6 filled into the gap of the first transition area 214 is insufficient, which leads to a poor sealing performance.

In an implementation, $L_1$ and $L_2$ satisfy the following relational expression: $L_2 \leq 0.4L_1$. The larger the $L_2$, the larger the gap of the first transition area 214; correspondingly, the value of $L_1$ also needs to be increased so as to provide sufficient colloids 6 to the gap of the first transition area 214. If $L_2$ is larger than $0.4L_1$, the amount of the colloids 6 filled into the gap of the first transition area 214 is insufficient, which leads to a poor sealing performance.

Referring to FIG. 5, the sealing part 21 further includes a second step area 213, and the second step area 213 is connected to the first step area 212 and located on both sides of the electrode lead 3 along the thickness direction Z. The insulation part 4 further has a second portion 42, and the second portion 42 is disposed between the second step area 213 and the electrode lead 3. In the second step area 213, the connection layers 223 of each packing film 22 are fused with the second portion 42.

Along the thickness direction Z, the sum of the thicknesses of the second step area 213, the second portion 42 and the electrode lead 3 is $H_3$. The value of $H_3$ is generally a constant. Of course, $H_3$ may fluctuate within a certain range such as plus or minus 0.01 mm owing to the hot pressing process.

In the second step area 213, the electrode lead 3 passes between the two layers of the packing films 22, so $H_3$ has a relatively large value. If $H_3$ equals to $H_2$, a relatively large height difference may exist between the first step area 212 and the main body area 211; when the hot pressing is performed, the relatively large height difference may cause stress concentration, which leads to a breakage of the metal layer 222 and affects the sealing performance.

Therefore, in an implementation, $H_3$ is larger than $H_2$. In this case, the first step area 212 may play a role of transition. The height difference between the first step area 212 and the main body area 211 and the height difference between the first step area 212 and the second step area 213 are both relatively small, which could lower the stress concentration, reduce the risk of breakage of the metal layer 222, and guarantee the sealing performance.

Referring to FIG. 9, the packaging device 5 further has a third packaging surface 53 which is sunk with respect to the second packaging surface 52. When the hot pressing is performed, the third packaging surface 53 acts on the second step area 213.

The sealing part 21 further includes a second transition area 215, and the second transition area 215 is connected between the first step area 212 and the second step area 213. The insulation part 4 further has a third portion 43, and the first portion 41 and the second portion 42 are connected by the third portion 43; the second transition area 215 covers the third portion 43 on both sides in the thickness direction Z.

The third portion 43 is connected to the connection layers 223 of the second transition area 215. Specifically, when the hot pressing is performed, the second portion 42 and the connection layers 223 located in the second step area 213 are heated and melt to produce colloids with viscosity. Part of the colloids 6 flow into a space between the second transition area 215 and the third portion 43 under the pressure and connect the second transition area 215 and the third portion 43.

Referring to FIG. 5, along a direction in which the main body area 211 points towards the second step area 213 and which is parallel to the width direction Y, the sum of the thicknesses of the second transition area 215 and the third portion 43 gradually increases. In this case, outer surfaces of the second transition area 215 are tilted with respect to both the width direction Y and the thickness direction Z. In the packing film 22, the thickness of the metal layer 222 is uniform. When the outer surface of the second transition area 215 is tilted, the metal layer 222 located in the second transition area 215 is tilted as well.

When the hot pressing is performed, the first step area 212 and the first portion 41 are melted and compressed under the action of the second packaging surface 52, and the second step area 213 and the second portion 42 are melted and compressed under the action of the third packaging surface 53. However, the second portion 42 is connected with the electrode lead 3 made of metal, so a heat dissipation rate of the second portion 42 is relatively high; therefore, compared with the first portion 41, a melting rate of the second portion 42 is relatively low. Correspondingly, compared with the first portion 41, a compression rate of the second portion 42 is relatively low. Therefore, when the hot pressing is performed, the second transition area 215 will be stretched.

In this embodiment, the metal layer 222 located in the second transition area 215 is disposed to be tilted, so that the extending length of the metal layer 222 located in the second transition area 215 could be increased, and an extending rate of the metal layer 222 located in the second transition area 215 during the hot pressing could be lowered, which could reduce the risk of breakage of the metal layer 222 and guarantee the sealing performance.

Because the second transition area 215 is disposed to be tilted, in order to ensure that the third portion 43 can be attached to the second transition area 215 and prevent the third portion 43 from hindering a deformation of the second transition area 215 during the hot pressing, the third portion 43 is required to have a tilted surface. In other words, along the direction in which the main body area 211 points towards the second step area 213 and which is parallel to the width direction Y, the thickness of the third portion 43 gradually increases.

In the following, the present application will be described in more detail in combination with embodiments.

Embodiment 1 may be prepared according to the steps described below:
(i) Stacking the anodic pole piece, the separator and the cathodic pole piece together, which are then coiled for multiple rounds and flattened into a flat shape after the coiling to prepare the electrode assembly 1.
(ii) Wrapping the insulation part 4 around outside of the electrode lead 3 and sticking the same to the electrode lead 3. The thickness of the first portion 41 of the insulation part 4 before the hot pressing is recorded as $T_1$.

(iii) Welding one electrode lead 3 to the anodic pole piece and welding the other electrode lead 3 to the cathodic pole piece.

(iv) Stamping a cavity on the packing film 22. The thickness of one layer of the packing film 22 is recorded as $T_2$.

(v) Placing the electrode assembly 1 into the cavity of one layer of the packing film 22, and covering the one layer of the packing film 22 from above with another layer of the packing film 22. The insulation part 4 is located between the two layers of the packing films 22.

(vi) Hot pressing the edge area of the two layers of the packing films 22 using the packaging device 5 to form the sealing part 21. After finishing the hot pressing, the thickness of the main body area 211 is measured as $H_1$ and the sum of the thicknesses of the first portion 41 and the first step area 212 as $H_2$ along the thickness direction Z. The width of the first step area 212 is $L_1$ and the width of the first transition area 214 is $L_2$ along the width direction Y.

(vii) Injecting an electrolyte into the packing bag 2, and then obtaining the battery after processes of standing, formation, shaping and so on. The battery is 231 mm in length, 163 mm in width and 8 mm in thickness.

Embodiments 2~35 and Comparative Examples 1~4 adopt the same preparation method as Embodiment 1, with differences in sizes of different areas of the sealing part 21. Specific parameters are as shown in Table 1.

Sealing tests are carried out for Embodiments 2~35 and Comparative Examples 1~4 as following.

Specifically, first the battery is placed in a vacuum chamber, and then the vacuum chamber is vacuumed; then the battery is charged and discharged circularly, and after 5 hours, the content of organic gas in the vacuum chamber is detected using an organic gas tester (VOC (Volatile Organic Compound) tester, with a model number: ppbRAE-3000). If the content of organic gas is less than 0.5 mg/m³, the battery meets the sealing requirements.

TABLE 1

Parameters and testing results of Embodiments 1-35 (E1-35) and Comparative Examples 1-4 (CE1-4)

| | $T_1$ (mm) | $T_2$ (mm) | $H_1$ (mm) | $H_2$ (mm) | $L_1$ (mm) | $L_2$ (mm) | $\dfrac{L_1 - 0.3}{10\,H_2 - 2}$ | $H_2$-$H_1$ (mm) | Content of organic gas (mg/m³) |
|---|---|---|---|---|---|---|---|---|---|
| E1  | 0.31 | 0.16 | 0.25 | 0.30 | 1.60 | 0.25 | 1.300 | 0.05 | 0.34 |
| E2  | 0.31 | 0.16 | 0.25 | 0.36 | 1.60 | 0.25 | 0.813 | 0.11 | 0.29 |
| E3  | 0.31 | 0.16 | 0.25 | 0.42 | 1.60 | 0.25 | 0.591 | 0.17 | 0.21 |
| E4  | 0.31 | 0.16 | 0.25 | 0.48 | 1.60 | 0.25 | 0.464 | 0.23 | 0.17 |
| E5  | 0.31 | 0.16 | 0.25 | 0.54 | 1.60 | 0.25 | 0.382 | 0.29 | 0.20 |
| E6  | 0.31 | 0.16 | 0.25 | 0.60 | 1.60 | 0.25 | 0.325 | 0.35 | 0.23 |
| E7  | 0.31 | 0.16 | 0.25 | 0.48 | 0.40 | 0.25 | 0.036 | 0.23 | 0.41 |
| E8  | 0.31 | 0.16 | 0.25 | 0.48 | 0.70 | 0.25 | 0.143 | 0.23 | 0.36 |
| E9  | 0.31 | 0.16 | 0.25 | 0.48 | 1.00 | 0.25 | 0.250 | 0.23 | 0.33 |
| E10 | 0.31 | 0.16 | 0.25 | 0.48 | 1.30 | 0.25 | 0.357 | 0.23 | 0.24 |
| E11 | 0.31 | 0.16 | 0.25 | 0.48 | 1.90 | 0.25 | 0.571 | 0.23 | 0.21 |
| E12 | 0.31 | 0.16 | 0.25 | 0.48 | 2.20 | 0.25 | 0.679 | 0.23 | 0.24 |
| E13 | 0.31 | 0.16 | 0.25 | 0.48 | 2.50 | 0.25 | 0.786 | 0.23 | 0.29 |
| E14 | 0.31 | 0.16 | 0.25 | 0.48 | 1.37 | 0.25 | 0.382 | 0.23 | 0.21 |
| E15 | 0.31 | 0.16 | 0.25 | 0.48 | 1.44 | 0.25 | 0.407 | 0.23 | 0.17 |
| E16 | 0.31 | 0.16 | 0.25 | 0.48 | 1.52 | 0.25 | 0.436 | 0.23 | 0.15 |
| E17 | 0.31 | 0.16 | 0.25 | 0.30 | 2.50 | 0.25 | 2.200 | 0.05 | 0.46 |
| E18 | 0.31 | 0.16 | 0.25 | 0.30 | 1.50 | 0.25 | 1.200 | 0.05 | 0.32 |
| E19 | 0.31 | 0.16 | 0.25 | 0.33 | 1.47 | 0.25 | 0.900 | 0.08 | 0.30 |
| E20 | 0.31 | 0.16 | 0.25 | 0.60 | 1.10 | 0.25 | 0.200 | 0.35 | 0.34 |
| E21 | 0.31 | 0.16 | 0.25 | 0.48 | 0.52 | 0.25 | 0.079 | 0.23 | 0.39 |
| E22 | 0.68 | 0.16 | 0.25 | 0.90 | 0.44 | 0.25 | 0.020 | 0.45 | 0.45 |
| E23 | 0.31 | 0.16 | 0.25 | 0.48 | 1.52 | 0.1  | 0.436 | 0.23 | 0.19 |
| E24 | 0.31 | 0.16 | 0.25 | 0.48 | 1.52 | 0.2  | 0.436 | 0.23 | 0.17 |
| E25 | 0.31 | 0.16 | 0.25 | 0.48 | 1.52 | 0.3  | 0.436 | 0.23 | 0.16 |
| E26 | 0.31 | 0.16 | 0.25 | 0.48 | 1.52 | 0.4  | 0.436 | 0.23 | 0.18 |
| E27 | 0.31 | 0.16 | 0.25 | 0.48 | 1.52 | 0.5  | 0.436 | 0.23 | 0.21 |
| E28 | 0.31 | 0.16 | 0.20 | 0.60 | 1.60 | 0.25 | 0.325 | 0.4  | 0.26 |
| E29 | 0.31 | 0.16 | 0.30 | 0.60 | 1.60 | 0.25 | 0.325 | 0.3  | 0.25 |
| E30 | 0.31 | 0.16 | 0.40 | 0.60 | 1.60 | 0.25 | 0.325 | 0.2  | 0.21 |
| E31 | 0.36 | 0.16 | 0.25 | 0.48 | 1.52 | 0.25 | 0.436 | 0.23 | 0.21 |
| E32 | 0.41 | 0.16 | 0.25 | 0.48 | 1.52 | 0.25 | 0.436 | 0.23 | 0.29 |
| E33 | 0.31 | 0.18 | 0.25 | 0.48 | 1.52 | 0.25 | 0.436 | 0.23 | 0.21 |
| E34 | 0.26 | 0.16 | 0.25 | 0.48 | 1.52 | 0.25 | 0.436 | 0.23 | 0.23 |
| E35 | 0.31 | 0.14 | 0.25 | 0.48 | 1.52 | 0.25 | 0.436 | 0.23 | 0.24 |
| CE1 | 0.79 | 0.16 | 0.25 | 1.00 | 0.38 | 0.25 | 0.010 | 0.45 | 0.56 |
| CE2 | 0.79 | 0.16 | 0.25 | 1.00 | 0.35 | 0.25 | 0.006 | 0.45 | 0.68 |
| CE3 | 0.31 | 0.16 | 0.25 | 0.28 | 2.50 | 0.25 | 2.750 | 0.03 | 0.53 |
| CE4 | 0.31 | 0.16 | 0.25 | 0.26 | 2.50 | 0.25 | 3.667 | 0.01 | 0.71 |

Referring to Comparative Examples 1-2, when $$\frac{L_1 - 0.3}{10H_2 - 2}$$

is relatively small, the value of $L_1$ is too small and the value of $H_2$ is too large. The value of $L_1$ being too small causes the amount of the colloids 6 produced during the hot pressing to be too small, so that the amount of the colloids 6 filled into the gap of the first transition area 214 is too small. Likewise, the value of $H_2$ being too large causes the amount of the colloids 6 of the first portion 41 and the connection layers 223 of the first step area 212 that are lost during the hot pressing to be too small, so that the amount of the colloids 6 filled into the gap of the first transition area 214 is insufficient. Therefore, in Comparative Examples 1-2, the colloids 6 cannot fully fill the gap of the first transition area 214, so that more gas and electrolyte are leaked, which severely affects the sealing performance of the battery.

Referring to Comparative Examples 3-4, when $$\frac{L_1 - 0.3}{10H_2 - 2}$$

is relatively large, the value of $L_1$ is too large and the value of $H_2$ is too small. The value of $L_1$ being too large causes the amount of the colloids 6 produced during the hot pressing to be too much, so that the amount of the colloids 6 filled into the gap of the first transition area 214 is too large. Likewise, the value of $H_2$ being too small causes the amount of the colloids 6 of the first portion 41 and the connection layers 223 of the first step area 212 that is lost during the hot pressing to be too large, so that the amount of the colloids 6 filled into gap of the first transition area 214 is too large. Therefore, in Comparative Examples 3-4, excessive colloids 6 flow to the main body area 211, which leads to uneven pressure and wrinkles on the main body area 211, thereby more gas and electrolyte leak, severely affecting the sealing performance of the battery.

Referring to Embodiments 1-35, when $H_2$ and $L_1$ satisfy the following relational expression:

$$0.02 \le \frac{L_1 - 0.3}{10H_2 - 2} \le 2.2,$$

the amount of the colloids 6 filled into the gap of the first transition area 214 could be maintained within a suitable range, the probability of leakage of the gas and electrolyte could be lowered, and the sealing performance of the packing bags 2 could be guaranteed.

Referring to Embodiments 1-6, with other parameters being determined, the sealing performance of the battery can be adjusted by changing the value of $H_2$. Referring to Embodiments 7-16, with other parameters being determined, the sealing performance of the battery can be adjusted by changing the value of $L_1$. It is seen from Embodiments 1-16 that when the value of $$\frac{L_1 - 0.3}{10H_2 - 2}$$

is around 0.44, the sealing performance of the batteries is the best.

Referring to Embodiments 16 and 23-27, the value of $L_2$ also has certain effects on the sealing performance of the battery. When the value of $L_2$ is too large, the gap of the first transition area 214 is too large and the amount of the colloids 6 filled into the gap of the first transition area 214 is insufficient, leading to a relatively poor sealing performance. When the value of $L_2$ is too small, the gap of the first transition area 214 is too small which causes the colloids 6 to flow towards the main body area 211, leading to wrinkles of the metal layers 222 located in the main body area 211 and a reduced sealing performance.

Referring to Embodiments 6 and 28-30, the value of $H_1$ also has certain effects on the sealing performance of the battery. After the hot press molding, the difference of $H_2$ and $H_1$ determines the size of the gap of the first transition area 214 along the thickness direction Z. In other words, the smaller the value of $H_2$-$H_1$, the smaller the volume of the gap of the first transition area 214, and the less the colloids 6 that are needed; inversely, the greater the value of $H_2$-$H_1$, the larger the volume of the gap of the first transition area 214, and the more the colloids 6 that are needed.

Referring to Embodiments 16 and 31-35, the values of $T_1$ and $T_2$ also have certain effects on the sealing performance of the battery. With $H_1$ and $H_2$ being constant, the larger the values of $T_1$ and $T_2$, the larger the compression ratio of the packing films 22 and the first portion 41 and the more the produced colloids 6 after the hot pressing. If the amount of the colloids 6 is too much, the colloids 6 will be caused to flow towards the main body area 211, which leads to wrinkles of the metal layers 222 located in the main body area 211 and a reduced sealing performance. With $H_1$ and $H_2$ being constant, the smaller the values of $T_1$ and $T_2$, the smaller the compression ratio of the packing films 22 and the first portion 41 and the less the produced colloids 6 after the hot pressing. If the amount of the colloids 6 is too little, the colloids 6 filled into the gap of the first transition area 214 are insufficient, which leads to a poor sealing performance.

The invention claimed is:
1. A secondary battery, comprising:
an electrode assembly;
a packing bag;
an electrode lead; and
an insulation part,
wherein the electrode assembly is housed in the packing bag, the packing bag has a sealing part on an edge, and the electrode lead is connected to the electrode assembly and passes through the sealing part,
wherein the sealing part comprises a main body area, a first step area and a first transition area; the main body area, the first transition area and the first step area are located on a same side of the electrode lead along a width direction, and the main body area, the first transition area and the first step area are successively arranged along a direction approaching the electrode lead,
wherein the insulation part is wrapped around outside of the electrode lead and separates the sealing part from the electrode lead; the insulation part has a first portion, and the first step area covers the first portion on both sides in a thickness direction,
wherein along the thickness direction, a thickness of the main body area is $H_1$, a sum of thicknesses of the first portion and the first step area is $H_2$; along the width direction, a width of the first step area is $L_1$, and

$H_1$, $H_2$ and $L_1$ satisfy the following relational expressions:

$$H_1 < H_2; \text{ and}$$

$$0.02 \le \frac{L_1 - 0.3}{10H_2 - 2} \le 2.2,$$

wherein $H_1$ is 0.2 to 0.4 mm, $H_2$ is 0.3 to 0.9 mm, and $L_1$ is 0.4 to 2.5 mm.

2. The secondary battery according to claim 1, wherein $H_2$ and $L_1$ satisfy the following relational expression:

$$0.08 \le \frac{L_1 - 0.3}{10H_2 - 2} \le 1.2.$$

3. The secondary battery according to claim 2, wherein $H_2$ and $L_1$ satisfy the following relational expression:

$$0.2 \le \frac{L_1 - 0.3}{10H_2 - 2} \le 0.9.$$

4. The secondary battery according to claim 3, wherein $H_1$ and $H_2$ satisfy the following relational expression:

0.1 mm<$H_2-H_1$<0.6 mm

5. The secondary battery according to claim 3, wherein, the sealing part further comprises a second step area, and the second step area is connected to the first step area and located on both sides of the electrode lead along the thickness direction;
the insulation part further has a second portion, and the second portion is disposed between the second step area and the electrode lead; and
along the thickness direction, a sum of thicknesses of the second step area, the second portion and the electrode lead is $H_3$, and $H_3$ is larger than $H_2$.

6. The secondary battery according to claim 3, wherein, the packing bag comprises two layers of packing films; the electrode assembly is located between the two layers of the packing films, and the two layers of the packing films are connected at an edge and form the sealing part;
each of the packing films comprises a protective layer, a metal layer and a connection layer; the connection layer is disposed on a surface of the metal layer facing the electrode assembly, and the protective layer is disposed on a surface of the metal layer away from the electrode assembly; and
in the main body area, connection layers of the two layers of the packing films are fused into a whole; in the first step area, the connection layer of each of the packing films is fused with the first portion.

7. The secondary battery according to claim 2, wherein $H_1$ and $H_2$ satisfy the following relational expression:

0.1 mm<$H_2-H_1$<0.6 mm

8. The secondary battery according to claim 2, wherein, the sealing part further comprises a second step area, and the second step area is connected to the first step area and located on both sides of the electrode lead along the thickness direction;
the insulation part further has a second portion, and the second portion is disposed between the second step area and the electrode lead; and
along the thickness direction, a sum of thicknesses of the second step area, the second portion and the electrode lead is $H_3$, and $H_3$ is larger than $H_2$.

9. The secondary battery according to claim 2, wherein, the packing bag comprises two layers of packing films; the electrode assembly is located between the two layers of the packing films, and the two layers of the packing films are connected at an edge and form the sealing part;
each of the packing films comprises a protective layer, a metal layer and a connection layer; the connection layer is disposed on a surface of the metal layer facing the electrode assembly, and the protective layer is disposed on a surface of the metal layer away from the electrode assembly; and
in the main body area, connection layers of the two layers of the packing films are fused into a whole; in the first step area, the connection layer of each of the packing films is fused with the first portion.

10. The secondary battery according to claim 1, wherein $H_1$ and $H_2$ satisfy the following relational expression:

0.1 mm<$H_2-H_1$<0.6 mm

11. The secondary battery according to claim 1, wherein, the main body area and the first step area are connected by the first transition area; the first transition area has two outer surfaces disposed oppositely along the thickness direction, and the two outer surfaces are tilted with respect to the main body area towards a direction approaching the first step area.

12. The secondary battery according to claim 11, wherein the two outer surfaces of the first transition area are disposed asymmetrically with respect to a plane that is perpendicular to the thickness direction.

13. The secondary battery according to claim 12, wherein along the width direction, a width of the first transition area is $L_2$, and $L_1$ and $L_2$ satisfy the following relational expression: $L_2 \le 0.4L_1$.

14. The secondary battery according to claim 13, wherein, the sealing part further comprises a second step area, and the second step area is connected to the first step area and located on both sides of the electrode lead along the thickness direction;
the insulation part further has a second portion, and the second portion is disposed between the second step area and the electrode lead; and
along the thickness direction, a sum of thicknesses of the second step area, the second portion and the electrode lead is $H_3$, and $H_3$ is larger than $H_2$.

15. The secondary battery according to claim 11, wherein along the width direction, a width of the first transition area is $L_2$, and $L_1$ and $L_2$ satisfy the following relational expression: $L_2 \le 0.4L_1$.

16. The secondary battery according to claim 1, wherein, the sealing part further comprises a second step area, and the second step area is connected to the first step area and located on both sides of the electrode lead along the thickness direction;
the insulation part further has a second portion, and the second portion is disposed between the second step area and the electrode lead; and
along the thickness direction, a sum of thicknesses of the second step area, the second portion and the electrode lead is $H_3$, and $H_3$ is larger than $H_2$.

17. The secondary battery according to claim 16, wherein,
the sealing part further comprises a second transition area, and the second transition area is connected between the first step area and the second step area;
the insulation part further has a third portion, and the first portion and the second portion are connected by the third portion; the second transition area covers the third portion on both sides in the thickness direction; and
along a direction in which the main body area points towards the second step area, a sum of thicknesses of the second transition area and the third portion gradually increases.

18. The secondary battery according to claim 1, wherein along the direction in which the main body area points towards the second step area, a thickness of the third portion gradually increases.

19. The secondary battery according to claim 18, wherein,
the packing bag comprises two layers of packing films; the electrode assembly is located between the two layers of the packing films, and the two layers of the packing films are connected at an edge and form the sealing part;
each of the packing films comprises a protective layer, a metal layer and a connection layer; the connection layer is disposed on a surface of the metal layer facing the electrode assembly, and the protective layer is disposed on a surface of the metal layer away from the electrode assembly; and
in the main body area, connection layers of the two layers of the packing films are fused into a whole; in the first step area, the connection layer of each of the packing films is fused with the first portion.

20. The secondary battery according to claim 1, wherein,
the packing bag comprises two layers of packing films; the electrode assembly is located between the two layers of the packing films, and the two layers of the packing films are connected at an edge and form the sealing part;
each of the packing films comprises a protective layer, a metal layer and a connection layer; the connection layer is disposed on a surface of the metal layer facing the electrode assembly, and the protective layer is disposed on a surface of the metal layer away from the electrode assembly;
in the main body area, connection layers of the two layers of the packing films are fused into a whole; in the first step area, the connection layer of each of the packing films is fused with the first portion.

* * * * *